United States Patent
Todd, Sr. et al.

(10) Patent No.: US 6,185,689 B1
(45) Date of Patent: Feb. 6, 2001

(54) METHOD FOR NETWORK SELF SECURITY ASSESSMENT

(75) Inventors: Robert E. Todd, Sr., Vienna; Aaron C. Glahe, Fairfax; Adam H. Pendleton, Leesburg, all of VA (US)

(73) Assignee: Richard S. Carson & Assoc., Inc., Bethesda, MD (US)

(*) Notice: Under 35 U.S.C. 154(b), the term of this patent shall be extended for 0 days.

(21) Appl. No.: 09/103,920

(22) Filed: Jun. 24, 1998

(51) Int. Cl.[7] .............................. G06F 11/30; G06F 1/24; G06F 15/16; G06F 17/00; H02H 3/05

(52) U.S. Cl. .......................... 713/201; 713/155; 714/26; 709/228; 705/53

(58) Field of Search ................................... 713/201, 200, 713/158, 155; 705/53, 51; 709/228; 714/25, 26

(56) References Cited

U.S. PATENT DOCUMENTS

| | | | |
|---|---|---|---|
| 4,956,769 | 9/1990 | Smith | 364/200 |
| 5,371,852 | 12/1994 | Attanasio et al. | 395/200 |
| 5,784,566 | 7/1998 | Viavant et al. | 395/200.59 |
| 5,812,763 | 9/1998 | Teng | 395/187.01 |
| 5,845,070 | 12/1998 | Ikudome | 395/187.01 |
| 5,892,903 | 4/1999 | Klaus | 395/187.01 |
| 5,968,177 | 10/1999 | Batten-Carew et al. | 713/201 |
| 5,983,273 | 11/1999 | White et al. | 709/229 |
| 5,987,611 | 11/1999 | Freund | 713/201 |
| 6,012,066 | 1/2000 | Discount et al. | 707/103 |
| 6,029,245 | 2/2000 | Scanlan | 713/200 |

FOREIGN PATENT DOCUMENTS

WO 99/56195   4/1999   (WO) .

OTHER PUBLICATIONS

Ken Phillips, "Netective Nixes Ne'er–Do–Wells," PC Week, Aug. 4, 1997, pp. 1–2, www.psrgroup.com.
"Security Administrator's Tool for Analysing Networks," Satan Release Info, Mar. 12, 1998, pp. 1–3 http://www.fish.com/satan/.
S. Garfinkel, S. L., "Security Issues—Satan Uncovers High Risk of WEB Attacks," Security Issues, Apr. 1995, pp. 1–3 http://www.haystack.com.
Internet Scanner Datasheet http://iss.net/prod/isds.html.
Cert–NL S–95–12 (Satan 1.1.1 release), Satan Release Information, Apr. 13, 1995.
List of TCPIP Addresses, Apr. 30, 1993.
Protection for Windows 95/NT, Key Internet Services—Nuke Protection, Oct., 1997.

*Primary Examiner*—Norman M. Wright
(74) *Attorney, Agent, or Firm*—Kirk D. Houser; Eckert Seamans Cherin & Mellott, LLC

(57) ABSTRACT

Security vulnerabilities of one or more target hosts are assessed by a remote or local host via a server. The hosts and the server are coupled to the internet and communicate via hypertext pages and email. A user at an arbitrary host on the internet inputs data identifying the user and/or the arbitrary host, and the target host. A network address is obtained for the user and a certification file such as Internic can be checked to determine a network address of the user and confirm that the user is authorized to assess the security vulnerabilities of the target host. A facts file is built on the server by polling the services available at the target host, including inquiries to the various ports of the TCP subsystem, for building a table of services and responses. A security algorithm compares the responses to stored data for identifying likely security vulnerabilities. A hypertext report file (transmitted in a secure manner) is made accessible to the arbitrary host, containing report information identifying likely security vulnerabilities and hyperlinks to descriptive information and outside advisory pages. The report file has a URL unique to the security inquiry, and is deleted after a predetermined time during which the assessment can be rerun by the user to assess the effect of fixes.

19 Claims, 16 Drawing Sheets

FROM: CARSON & ASSOCIATES <security@wwdsi.com>
DATE: WEDNESDAY, MAY 27, 1998 8:48 AM
SUBJECT: SECURE SELF-ASSESSMENT TOOL

FIRST EMAIL FOR SINGLE MACHINE ASSESSMENT

HELLO JOHN DOE

YOU HAVE PURCHASED SEVEN-DAY ACCESS TO WWDSI's SSAT SINGLE MACHINE ASSESSMENT, YOUR FIRST STEP TOWARD SECURE COMPUTER RESOURCES. CLICK ON THE LINK BELOW TO GO TO YOUR PERSONAL SINGLE MACHINE ASSESSMENT WEB PAGE CONTAINING SIMPLE INSTRUCTIONS ON CONDUCTING YOUR ASSESSMENT. YOU MAY USE THIS SECURITY SELF-ASSESSMENT TOOL TO EVALUATE YOUR IP ADDRESS AS MANY TIMES AS NECESSARY DURING THE PURCHASED ACCESS PERIOD ENDING

06/03/98

THIS GIVES YOU THE OPPORTUNITY TO APPLY THE RECOMMENDED FIXES AND RETEST IF NECESSARY

THANK YOU FOR USING SECURITY SELF-ASSESSMENT TOOL

GO TO:
https://secure.wwdsi.com/users/single/2716319985105482708.html
42

FIG.9

FROM: CARSON & ASSOCIATES <security@wwdsi.com>
DATE: WEDNESDAY, MAY 27, 1998 9:03 AM
SUBJECT: SCAN ASSESSMENT RESULTS LINK SECOND EMAIL -- SINGLE MACHINE ASSESSMENT
PERFORMED A SINGLE MACHINE ASSESSMENT...
YOUR SSAT SINGLE MACHINE ASSESSMENT IS NOW COMPLETE.

CLICK ON THE LINK BELOW TO REVIEW THE RESULTS
OF YOUR SCAN. TO MAINTAIN A HISTORICAL RECORD
OF THE RESULTS OF YOUR SCANS, SIMPLY PRINT THEM.
YOU MAY USE THIS SECURITY SELF-ASSESSMENT TOOL TO
EVALUATE YOUR MACHINE(S) AS MANY TIMES AS NECESSARY
DURING THE PURCHASED ACCESS PERIOD. THIS GIVES YOU
THE OPPORTUNITY TO APPLY THE RECOMMENDED FIXES
AND RETEST IF NECESSARY.

THANK YOU FOR USING WWDSI PRODUCTS.

GO TO https://secure.wwdsi.com/cgi-bin/assess/display?user=27163199985105482708&scantype=single
42

*FIG. 10*

ASSESSMENTS
SINGLE MACHINE ASSESSMENT 
DENIAL OF SERVICE ASSESSMENT 
FULL NETWORK ASSESSMENT 
*32*
FIG. 11

SINGLE MACHINE ASSESSMENT

BEFORE YOU MAY PURCHASE YOUR SEVEN DAY ACCESS TO SSAT (SINGLE MACHINE ASSESSMENT), YOU MUST READ AND ACCEPT THE FOLLOWING AGREEMENT. AFTER YOU HAVE CHECKED THE "ACCEPT" BOX BELOW, YOU WILL BE GUIDED THROUGH THE ORDERING PROCESS.

BY CLICKING ON THE "ACCEPT" BUTTON YOU ARE CONSENTING TO BE BOUND BY ALL OF THE TERMS OF THIS AGREEMENT. IF YOU DO NOT AGREE TO ALL OF THE TERMS OF THIS AGREEMENT, CLICK THE "DO NOT ACCEPT" BUTTON.

*AGREEMENT*

[SERVICES] SUBJECT TO THE PROVISIONS CONTAINED HEREIN, THE SERVICE PROVIDER AGREES TO CONDUCT THE TYPE OF SECURITY SELF-ASSESSMENT TOOL (SSAT) ASSESSMENT SELECTED BY YOU, AS DESCRIBED ON THE SCREEN FOR EACH TYPE OF ASSESSMENT. YOU AGREE TO PAY THE FEE REQUIRED FOR SUCH SERVICES AND TO USE THE SERVICES WITHIN ANY LIMITATION STATED IN THE DESCRIPTION OF SERVICES OF THE ASSESSMENT YOU HAVE SELECTED.

[CONTENT]

[TERM]

[DISCLAIMER OF WARRANTY]

[LIMITATION OF LIABILITY]

[CROSS-LINKS]

[EXPORT CONTROLS]

[US GOVERNMENT RIGHTS]

[GENERAL]

[TERMS SET FORTH HEREIN]

ACCEPT    DO NOT ACCEPT

*FIG.12*

SINGLE MACHINE
ASSESSMENT

THE FOLLOWING INFORMATION IS REQUIRED FOR ACCESS TO THE SECURITY SELF-ASSESSMENT TOOL (SSAT) SUITE. PLEASE BE SURE TO FILL IN ALL FIELDS. THIS CONFIDENTIAL INFORMATION WILL BE USED SOLELY BY THE SERVICE PROVIDER FOR THE EXPRESSED PURPOSES OF THIS TRANSACTION AND SUBSEQUENT CORRESPONDENCE RELATED TO THE RESULTS OF YOUR SECURITY ASSESSMENT.

PERSONAL INFORMATION

NAME: [        ]
ADDRESS LINE 1: [        ]
ADDRESS LINE 2: [        ]
CITY: [        ]
STATE: [SELECT STATE ▼]
ZIP: [        ]
PHONE: [( )] [   ]-[     ]
EMAIL: [        ]

CREDIT CARD INFORMATION

TYPE OF CREDIT CARD [SELECT A CARD ▼]
NAME ON CARD: [        ]
ACCOUNT NUMBER: [        ]
EXPIRES (MONTH/YEAR): [MONTH ▼] / [YEAR ▼]

[ RESET ]  [ SUBMIT QUERY ]

SINGLE MACHINE
ASSESSMENT

THANK YOU

JOHN DOE

YOU HAVE COMPLETED THE INITIAL PURCHASE STEP FOR YOUR ASSESSMENT. IN THE NEXT STEP, YOU WILL RECEIVE AN EMAIL MESSAGE CONTAINING A LINK TO YOUR PERSONAL ASSESSMENT WEB PAGE, WITH DETAILED INSTRUCTIONS ON CONDUCTING YOUR ASSESSMENT. ACCESS TO THIS WEB PAGE IS GRANTED FOR A SEVEN DAY PERIOD DURING WHICH YOU MAY CONDUCT ASSESSMENTS, IN THIS WAY, YOU HAVE THE OPPORTUNITY TO EMPLOY THE RECOMMENDED FIXES AND RETEST AS MANY TIMES AS NECESSARY DURING THE PURCHASED ACCESS PERIOD ENDING 06/03/98.

PERSONAL INFORMATION RECORDED

NAME: JOHN DOE
ADDRESS 1: SOMEPLACE
ADDRESS 2: SUITE 100
CITY: RESTON
STATE: VIRGINIA
ZIP: 20190
PHONE: (555)555-5555
EMAIL: glahea@reston.carsoninc.com

CREDIT CARD INFORMATION RECORDED

BRAND: VISA
NAME ON CARD: JOHN DOE
ACCOUNT 1234567890123456
EXPIRES 4/2001

*FIG.14*

SINGLE MACHINE
ASSESSMENT

SINGLE SCAN

CLICK HERE IF THIS IS YOUR FIRST SCAN OR IF YOU DO NOT WANT TO REVIEW THE RESULTS OF YOUR LAST SCAN. DURING THE ASSESSMENT, WHICH MAY TAKE 10 TO 15 MINUTES TO COMPLETE, YOU MAY FEEL FREE TO USE OTHER APPLICATIONS ON YOUR COMPUTER; HOWEVER, YOU MUST MAINTAIN INTERNET CONNECTIVITY. YOU WILL BE NOTIFIED THAT THE SCAN IS COMPLETE WITH AN EMAIL MESSAGE CONTAINING THE SCAN RESULTS. UPON RECEIPT OF THIS MESSAGE, YOU MAY TERMINATE YOUR INTERNET CONNECTION, IF DESIRED.

DISPLAY PREVIOUS SCAN

CLICK HERE IF YOU WANT TO REVIEW THE RESULTS OF YOUR LAST SCAN. THIS INFORMATION IS PROVIDED SO THAT YOU MAY COMPARE THE RESULTS BEFORE AND AFTER IMPLEMENTING RECOMMENDED FIXES.

*FIG.15*

SINGLE MACHINE
ASSESSMENT

WHILE THE SINGLE MACHINE ASSESSMENT IS WORKING, PLEASE REMEMBER TO MAINTAIN INTERNET CONNECTIVITY. THIS MAY TAKE 10 TO 15 MINUTES, DEPENDING ON THE SPEED OF YOUR INTERNET CONNECTION. DURING THIS TIME, YOU MAY FEEL FREE TO GO ELSEWHERE ON THE INTERNET OR USE OTHER APPLICATIONS ON YOUR COMPUTER.

YOU WILL KNOW THE SCAN IS COMPLETE WHEN YOU RECEIVE THE RESULTS IN AN EMAIL MESSAGE AT THE FOLLOWING ADDRESS:

glahea@reston.carsoninc.com

UNPRIVILEGED NFS ACCESS

SUMMARY

THIS VULNERABILITY ALLOWS AN NFS SERVER TO EXECUTE REQUESTS FROM UNPRIVILEGED USER PROGRAMS.

IMPACT

A MALICIOUS USER CAN EXECUTE NFS FILE ACCESS REQUESTS ON BEHALF OF ANY USER. IN OTHER WORDS, A MALICIOUS USER IS ABLE TO IMPERSONATE A TRUSTED USER ON THE SYSTEM AND ACCESS FILES AND EXECUTE PROGRAMS ON A MOUNTED FILE SYSTEM.

BACKGROUND

WHEN A NFS CLIENT HOST WANTS TO ACCESS A REMOTE FILE OR DIRECTORY, ITS OPERATING SYSTEM SENDS A REQUEST TO THE NFS SERVER. THE REQUEST SPECIFIES, AMONG OTHERS, A FILE IDENTIFIER, THE OPERATION (READ, WRITE, CHANGE PERMISSION, ETC.) AND THE IDENTITY OF THE USER ON WHOSE BEHALF THE OPERATION IS TO BE DONE.

BY DEFAULT, THE USER IDENTITY IS SPECIFIED WITH THE UNIX NUMERIC USER AND GROUP IDs. WITH THIS SCHEME, ALSO CALLED AUTH_UNIX, THE SERVER SIMPLY BELIEVES ANYTHING THAT THE CLIENT SENDS IT.

THE PROBLEM

AN NFS REQUEST IS NOTHING BUT A NETWORK MESSAGE. ANY USER CAN RUN A PROGRAM THAT GENERATES ARBITRARY NFS REQUESTS. SUCH PROGRAMS HAVE BEEN AVAILABLE FOR SEVERAL YEARS, AND WRITING THEM DOES NOT REQUIRE UNUSUAL PROGRAMMING SKILLS.

WHEN AN NFS SERVER ACCEPTS REQUESTS WITH AUTH_UNIX AUTHENTICATION FROM UNPRIVILEGED USER PROGRAMS, A MALICIOUS USER CAN EXECUTE FILE ACCESS REQUESTS ON BEHALF OF ANY USER. REASON: WITH AUTH_UNIX AUTHENTICATION, THE USER IDENTITY IS NOTHING BUT A FEW USER AND GROUP ID NUMBERS IN A NETWORK MESSAGE.

RESOLUTION
TO FIX THIS VULNERABILITY, AVOID AUTH_UNIX AUTHENTICATION AND USE SOMETHING THAT INVOLVES CRYPTOGRAPHY. FOR EXAMPLE, SECURE NFS WITH <u>DES</u> OR <u>KERBEROS</u> CREDENTIALS. UNFORTUNATELY, MANY NFS IMPLEMENTATIONS SUPPORT AUTH_UNIX AUTHENTICATION ONLY. CONSULT YOUR SYSTEM DOCUMENTATION.

A PARTIAL, BUT MORE COMMON, SOLUTION IS TO CONFIGURE THE NFS SERVER, AND WHERE POSSIBLE, THE MOUNT DAEMON, TO ACCEPT REQUESTS ONLY FROM PRIVILEGED SYSTEM PROGRAMS (SUCH AS UNIX KERNELS), AND TO REJECT NFS REQUESTS THAT ARE SENT BY UNPRIVILEGED USER PROGRAMS.

- SunOS 4 ADMINISTRATORS MODIFY /etc/rc.local
  - rpc.mountd (no -n option)
  - echo "nfs_portmon/W1"| adb -w /vmunix /dev/kmem

- SunOS 5 ADMINISTRATORS MODIFY /etc/system
  - set nfs:nfs_portmon=1

ON OTHER SYSTEMS, THE MOUNTD COMMAND-LINE OPTIONS DIFFER, AND THE KERNEL VARIABLE MAY BE CALLED *nfsportmon* OR SOMETHING SIMILAR.

*NOTE: REJECTING NFS REQUESTS FROM UNPRIVILEGED USER PROGRAMS DOES NOT PROTECT YOUR SERVERS AGAINST MALICIOUS SUPERUSERS OR AGAINST MALICIOUS PC PROGRAMS.*

OTHER TIPS
- WHERE PRACTICAL, EXPORT FILE SYSTEMS READ-ONLY
- CONSIDER BLOCKING PORTS 2049 (NFS) AND 111 (PORTMAP) ON YOUR ROUTERS.

WHERE CAN I READ MORE ABOUT THIS?
GENERAL METHODS TO AVOID AND FIX NFS VULNERABILITIES MAY BE FOUND IN CERT ADVISORY 94:15.

*FIG.18B*

UNRESTRICTED X SERVER ACCESS

SUMMARY

THIS VULNERABILITY ALLOWS UNRESTRICTED X server ACCESS FROM ARBITRARY HOSTS

IMPACT

A REMOTE INTRUDER CAN CONTROL THE KEYBOARD, MOUSE AND SCREEN.

BACKGROUND

THE X Window system IMPLEMENTS AN ENVIRONMENT WHERE APPLICATIONS USE THE NETWORK TO INTERACT WITH A USER WORKSTATION'S DISPLAY, KEYBOARD AND MOUSE. THERE ARE TWO CLASSES OF PROGRAMS:

- THE X server: THIS PROGRAM MANAGES THE USER'S WORKSTATION DISPLAY AND INPUT DEVICES
- X clients: THE APPLICATION THAT RUNS ON THE USER'S WORKSTATION OR ELSEWHERE IN THE NETWORK

THE PROBLEM

THE VULNERABILITY IS THAT WHEN THE X server PERMITS ACCESS FROM ARBITRARY HOSTS ON THE NETWORK, A REMOTE INTRUDER CAN CONNECT TO THE X server AND:

- READ THE USER'S KEYSTROKES, INCLUDING ANY PASSWORDS THAT THE USER TYPES
- READ EVERYTHING THAT IS SENT TO THE SCREEN
- WRITE ARBITRARY INFORMATION TO THE SCREEN
- START OR TERMINATE APPLICATIONS
- TAKE CONTROL OF THE USER'S SESSION

RESOLUTION

TO CORRECT HIS VULNERABILITY, REMOVE ALL INSTANCES OF THE xhost + COMMAND FROM THE SYSTEM-WIDE Xsession FILE, FROM USER .xsession FILES, AND FROM ANY APPLICATION PROGRAMS OR SHELL SCRIPTS THAT USE THE X window system.

OTHER TIPS INCLUDE USING THE x magic cookie mechanism OR EQUIVALENT. WITH LOGINS UNDER CONTROL OF xdm, YOU TURN ON AUTHENTICATION BY EDITING THE xdm-config FILE AND SETTING the DisplayManager*authorize ATTRIBUTE TO true. ALSO, WHEN GRANTING ACCESS TO THE SCREEN FROM ANOTHER MACHINE, USE THE xauth COMMAND IN PREFERENCE TO THE xhost COMMAND.

WHERE CAN I READ MORE ABOUT THIS?

YOU CAN READ MORE ABOUT X SECURITY BY VISITING THE X SECURITY PROTECTIONS PAGE. ALSO, YOU CAN VISIT THE ADMIN GUIDE TO CRACKING FOR AN EXAMPLE OF WHY THIS VULNERABILITY IS A PROBLEM.

*FIG.19*

METHOD FOR NETWORK SELF SECURITY ASSESSMENT

BACKGROUND OF THE INVENTION

1. Field of the Invention

The invention relates to the field of computer network security, and in particular concerns an internet or intranet based technique by which operators, who need not have extensive knowledge of network TCP/IP subsystems, can assess the vulnerability of any or all of their network hosts (e.g., servers and workstations) to a variety of intrusion methods. A host or server operating the security system according to the invention uses communication techniques to confirm the identity of an operator who seeks an assessment, and may effect a credit or bank account transaction as a means of payment. A hypertext web page is generated on the security system server for starting the assessment, having a URL that is unique to the operator's request. The URL of the starting page is reported to the qualified operator by email. The operator selects a level of security assessment by selecting a number or class of network hosts to be analyzed and a level of intensity for the analysis. The security system server then launches a series of selected inquiries by TCP/IP communications, assesses points of vulnerability, and inserts hypertext links into the report page, naming vulnerabilities found and linking to hypertext pages explaining each vulnerability and directing the operator to potential fixes and further information. The assessment can be repeated as often as necessary during a limited time period, for example to test fixes made after earlier reports of vulnerability. After the limited time period, the report page and its URL are removed.

2. Prior Art

Standards have been developed for network communications among workstations and servers (collectively "hosts"), and are well documented. The same standards that apply to open network communications can also be used in communications among hosts on a local area network or a wide area network. Communications of this type generally fall into two categories, namely TCP and UDP.

In TCP ("transmission connection protocol"), a connection is made and held between the source of the data and an at-least intermediate destination. Delivery of data in TCP is more or less guaranteed once a connection is made.

In UDP ("user datagram protocol"), data packets are transmitted from a source to a destination, but no standing connection is made. In UDP, it is up to the programmer designing the software to guarantee reliability of the communication session.

Depending upon whether a host is configured to provide the services of a web server, a router, a workstation or the like, that host must be configured to respond to the appropriate inquiries needed to function. When the TCP/IP subsystem of the host is enabled to respond to these inquiries by the software that enables the host to operate as a server, router, etc., one of the numbered TCP ports is caused to respond to the appropriate inquiry.

Some services provide usernames and TCP/IP addresses, and a remote host can use the noted services to learn usernames and/or addresses and thereafter attempt to determine further information or use the information to mount an attack. With a knowledge of usernames, an iterative routine or a program having a dictionary file can attempt to determine passwords randomly or to guess passwords using common words, and attempt to log into a host as a given user. On some servers, particularly of Internet service providers, usernames are used to define the paths to the users' subdirectories. An authorized user can log in to their ISPs server, under their own username, then change directory up a level, and obtain the usernames of all subscribers by listing the username subdirectories. Depending on rights granted, this could enable subscribers to monitor shells, last login times, alter personal web page content and even read or insert pending email messages. It may or may not be appropriate for all such capabilities to be open to users, but in such instances it is appropriate for both the subscribers and the operator of the server to understand fully where the system is vulnerable to attack. For these and other reasons it can be difficult for systems administrators or others to determine the true identity of a person who obtains unauthorized access to information or services.

Networks that may be vulnerable to attack or contain confidential information may be protected by firewalls. Firewalls are intermediate computers that are coupled between a protected network server and the Internet. A firewall is basically a router having filters that pass certain forms of messages and block others. Of course a firewall does not address the possibility of an attack from a user within the network protected by the firewall.

A firewall can be more or less aggressive at blocking messages. Aggressive filtering means that fewer services can be made available in one direction or the other through the firewall. Insufficient filtering leaves the network open to attack. A proper balance is sought by system administrators in setting up the filtering that will be undertaken by the firewall, to provide the needed services and minimize dangers of unauthorized access and of damaging attack. Both innocent and malicious requests are blocked. Firewalls also may provide proxy or masquerading services which "hide" the presence of computers behind it.

One form of attack that is particularly troublesome is a "denial of service" attack. Networks providing information services that are critical for reasons of public safety or national defense need to be operational when called upon. A denial of service attack on a given host or TCP/IP address can result in that host (workstation or server) locking up (e.g., displaying the so-called "blue screen of death," normally a general protection fault) requiring that the affected host be rebooted. A server lockup can disable useful operation of all users logged onto that server by precluding access to shared data. An attack on an individual host on the network at least can disable that host, and it is possible to mount a denial of service attack on all the hosts on a network simultaneously.

Several denial of service attacks are well known and documented, and software patches are available to deal with most of them. For example, the Windows NT service pack from Microsoft deals with certain vulnerabilities found in the Windows TCP/IP subsystem. An example is the Window OOB Bug (aka "WinNuke"). A program can send out of band (OOB) data to a TCP/IP address at which a Windows machine is coupled to the network, for example attacking NetBIOS (TCP port 139). The Windows machine is unable to handle the data and can lock up.

A program called SPING sends fragmented ICMP packets to a TCP address of a Windows machine, requesting an echo of the packet. The machine attempts to reassemble the packets but they cannot be reassembled. The machine's buffers overload and the machine locks up. Similarly, spoofed connection requests can be sent by TCP to a Windows host in a so-called Land Attack. SYN packets are sent to the host address as the destination and appear to have the same address as the source. That is, the packets have the same host and port numbers identifying the source and the destination. As it attempts to resolve the conflict of having information simultaneously being sent and received by the same host over the same port, the system slows down.

The Tear Drop and New Tear Drop (or Bonk) attack concern sending overlapping TCP/IP fragments or corrupted UDP fragments. These attacks fill the available memory buffer space and eventually crash the machine.

The foregoing attacks are exemplary. Additional attacks become possible periodically, as the implementation of the TCP/IP system is further understood. Additionally, public service organizations monitor reports of attacks and publish advisories containing strategies for dealing with attacks. The organizations include CERT, CIAC, ASSIST, and others.

In April 1995, a software package called Security Administrators Tool for Analyzing Networks (SATAN) was made publicly available to enable systems administrators to obtain an automated assessment of their network security. SATAN provides source code for operation on a Unix system. When compiled, configured and run, SATAN attempts to access certain critical data files, to effect file transfers considered dangerous, and to determine which programs are in use. SATAN cannot fully assess a system via TCP/IP through a firewall, from any arbitrary host on the Internet. The administrator can readily configure their firewall to filter certain inquiries such as PING requests, and can block FTP access to files on hosts within the firewall and the like. Thus SATAN is substantially intended for a systems administrator to get his or her own network house in order via internal checks. The systems administrator configures SATAN for operation on their particular system and runs the program to determine whether certain vital network data is accessible.

The foregoing problems have been the subject of various advisories from CERT or CIAC and their implications and fixes are documented in various publications. Although they represent some important potentially exploitable information leaks as well as opportunities for a knowledgeable hacker to wreak mischief or damage to the network, they do not address various possible denial of service vulnerabilities, and do not address a likely source of attack, namely an arbitrary host communicating in TCP or UDP from outside the firewall.

Additionally, as its authors recognize, a security program such as SATAN is a two edged sword. It is helpful to permit systems administrators to identify security gaps which are then plugged by appropriate fixes, but the information it generates is of offensive value to a hacker, because SATAN could enable an easy and automated identification of unfixed network vulnerabilities that might be exploited. As a result, it would be highly inappropriate to permit the operation by others of such a security assessment program on one's network. It would also appear to be ill advised to permit operation of a security assessment program through a firewall, or even to open the firewall filters sufficiently to permit TCP and UDP communications that could conceivably assess, and therefore potentially exploit, vulnerabilities of the TCP/UDP subsystems. On the other hand and as mentioned above, the alternative is to deny access to services that are useful in Internet communications.

It would be advantageous, and it is an object of the present invention, to provide a security assessment program that is not limited to internal operation on a network Unix server, that can be operated conveniently and securely from a World Wide Web (WWW) browser at an arbitrary host, that fully assesses file access, version information, and vulnerability to denial of service attacks, but which has sufficient security to minimize the danger of exploitation by hackers to obtain offensive information.

SUMMARY OF THE INVENTION

It is an object of the invention to provide a security self assessment method operable over the open internet, for assessing the vulnerability of one or more hosts, while minimizing the possibility that the method can be used by unauthorized persons to identify security shortcomings in another party's host or network.

It is also an object to assess security dangers such as critical file accessibility, denial of service exposure, existence of obsolete software versions and the like, using TCP/IP transmissions from a server operating a security assessment routine, the server effecting communications with the user and with outside certification and address directory services.

It is another object of the invention to arrange a security system as described above, which accepts user identification information using hypertext forms and communicates with the user, including reporting the results of tests, using email and hypertext links.

These and other objects are accomplished by assessing the security vulnerabilities of one or more target hosts via a server, from an arbitrary remote or local host, which may or may not be the target host. The host(s) and the server are coupled to the Internet and communicate via hypertext pages and email. A user at an arbitrary host on the Internet inputs data identifying the user and/or the arbitrary host, and the target host. A network address is obtained for the user and a certification from Internet authorities (such as Internic) can be checked to determine a network address of the user and confirm that the user is authorized to assess the security vulnerabilities of the target host.

A database is built on the server by polling the services available at the target host(s), including inquiries to the various ports of the TCP subsystem(s), for building a table of services and responses. A security algorithm compares the responses to stored data for identifying likely security vulnerabilities. A hypertext report file is made accessible to the arbitrary host, containing report information identifying likely security vulnerabilities and hyperlinks to descriptive information and outside advisory pages. The report file has a URL unique to the security inquiry, and is deleted after a predetermined time during which the user, to assess the effect of fixes, can rerun the assessment. All reports sent to the customer are encrypted to protect the vulnerability information. Industry standard 128-bit Secure Socket Layer (SSL) encryption using X.509 certificates preferably is employed.

Transactions can include accepting payment information from the user and exchanging data with a third party for accepting payment in connection with a transaction for security assessment services.

A single target host can be assessed, or a number of hosts. The identification of the target host, for example, may be only to the extent of an upper level domain TCP/IP address (e.g., Class C network). The security assessment is conducted on all hosts found at lower levels of the upper level domain. Reasonable protection against inadvertent or malicious scans are provided by (1) verifying that customer is a recognized administrator for the customer's domain and (2) ensuring that each host to be scanned belongs to the customer's domain. The routine for assessing vulnerabilities assesses many of the same vulnerabilities as programs such as SATAN, but the method is operable in a firewalled environment so as to permit these tests to be successful, as well as adding tests for vulnerability to denial of service attacks, which include sending corrupted or illogically addressed packets to the target host, that may cause the target host to lock up. A lockup of the target host can be apparent at the server (as well as at the target host), and is reported as a vulnerability. The assessment can continue when the target host is rebooted. The database and/or report hyperlink file generally record the presence of services on the target host; vulnerability of the target host TCP ports to denial of service attack; accessibility of target host files to the arbitrary host for one of viewing and export; the presence of predetermined versions of operating software; shell access availability to the arbitrary host; acceptance of ftp transfers with the target host; target host access control settings, etc.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 9 is an initial email transmission to a user seeking a security assessment.

FIG. 10 is a second email transmission containing a link for the user to access a report.

FIG. 11 is an initial hypertext screen accessed by the user.

FIGS. 12A–12C is an explanatory page for single machine assessment.

FIG. 13 is a form page for entering user information, used for authorizing a security assessment, and FIG. 14 is an example of the information entered.

FIG. 15 is a linked page for selecting a new scan or review of the results of a previous scan.

FIG. 16 is a page sent upon commencing the scan, notifying the user where the results will be reported.

FIGS. 18A–18B and 19 are pages to which the links in FIG. 17 direct the user regarding specific reported security vulnerabilities.

DETAILED DESCRIPTION OF THE PREFERRED EMBODIMENTS

Figure 1:
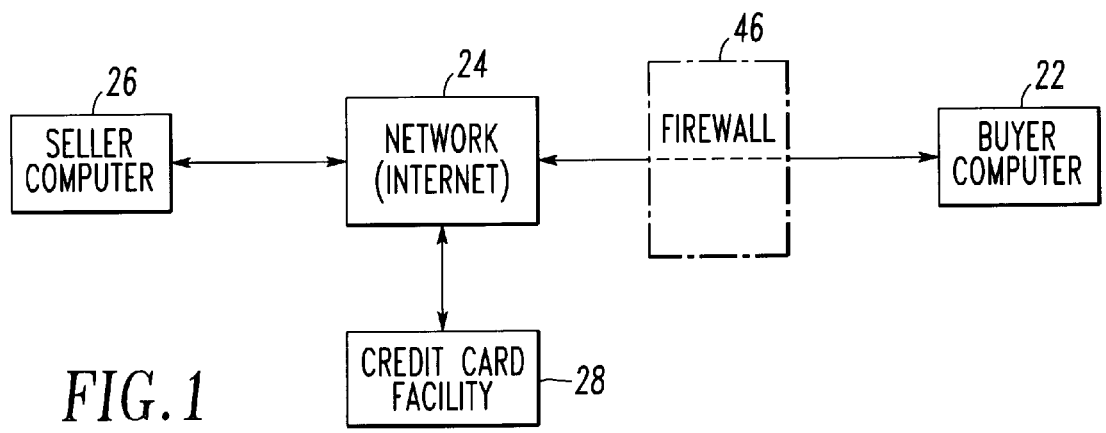
FIG. 1 is a flow chart illustrating network communications for operation of the security assessment method of the invention.

Referring to FIG. 1, the invention generally provides a method for assessing the security vulnerability of one or more target hosts 22 coupled to a network 24 such as the Internet, while guarding against a breach of security that might occur if the service permitted any user to assess the security vulnerability of any host. The service is provided from a server 26 identified as the Seller Computer in FIG. 1 to Buyer Computer 22 or another user being assessed at the request of a user operating Buyer Computer 22. The communications are undertaken over the open network, and may involve communications with one or more third party hosts 28 for handling payment for the service as in FIG. 1 (using secure communications), and potentially also with other parties such as Internic to verify the identity of a network system operator, whereby names and email addresses can be matched.

Figure 2:
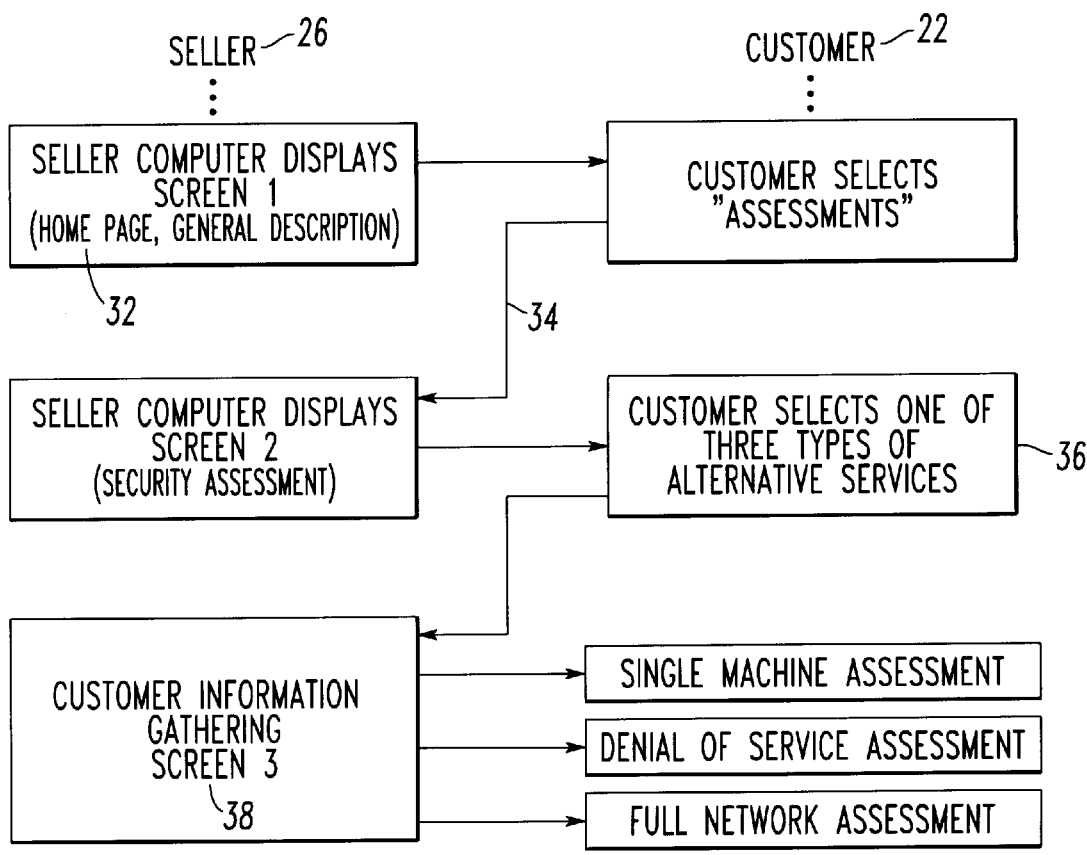
FIG. 2 is a flow chart illustrating the security service provider and customer communications undertaken for selecting a security assessment of one or more hosts.
Figure 3:
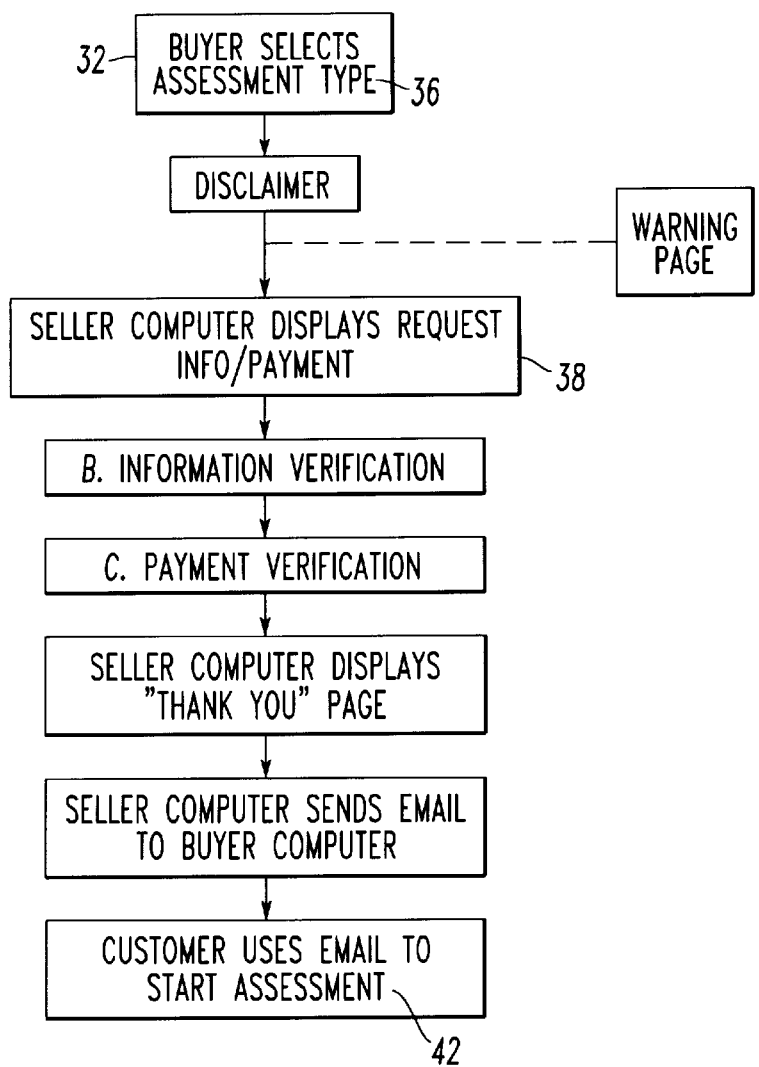
FIG. 3 is a flow chart illustrating information gathering steps.

Seller Computer 26 is a server on the Internet with internet-accessible hypertext pages accessible to arbitrary users by URL. A user at any arbitrary host on the Internet can input to the server their username and domain name, and an identification of the target host 22. Referring to FIG. 2, the Seller maintains an initial hypertext page 32 which the user accesses to initiate the process (see also FIG. 11). Among other things the initial page includes a hypertext link 34 for selecting the security assessment service, which leads to a further page providing for alternative assessment selections 36, such as single or multiple host assessments and assessments such as denial of service attacks.

Information identifying the user is gathered using a form page 38 (see also FIG. 13). The user enters name, address, phone number, and email address twice (for confirmation purposes). In the embodiment shown, the service is provided for a fee, and the user or customer is required to enter credit card information, which is verified by communications between the server and a third party credit card company who verifies the necessary transfer of funds (using an appropriate secure protocol). At that point the user is authorized to obtain a security assessment. Seller Computer or server 26 reports back to the user that payment has been received and invites the user to check his or her email messages for further information.

The email sent by the seller to the authorized user contains a link 42 to a hypertext page on the server that is unique to the user and the assessment or series of assessments to be conducted over a limited period of time. By providing a URL to the unique page by email, it is not possible for a user to employ an anonymous name or other spoofing technique to obtain an assessment using only anonymous hypertext page linking. Instead the user's email address is determined and used as a secure means to report to the user the URL link to his or her assessment data.

After the user initiates the test that was selected earlier, the server computer begins the assessment. A facts file is established on the server, associated with the security inquiry. The server communicates with the target host or hosts, determining the services available at the target host 22. A table of the available services is built. The server notes the presence of any service that it detects.

Based on the services found, a security algorithm 44 compares the responses to stored data for identifying likely security vulnerabilities as a function of the responses. A hypertext report file is then generated (see FIG. 17), accessible to the arbitrary host by the unique page URL that was reported to the user's email address. The report file 48 contains information identifying likely security vulnerabilities. These are listed in the report file as hypertext links 52 to information respecting each vulnerability. These links 52 can direct the user to information on server 26 or to third party advisory boards such as CERT.

The report file and the results of the security assessment are maintained only for a predetermined time period, such as a week, during which time the user can attempt to fix security vulnerabilities that were found, and run the assessment again. Limiting the time that the report is available and generating a randomized long file name for the URL that identifies the report, minimize the potential that another party may obtain access to the security assessment report. The report file is unique to the security inquiry, user and arbitrary host, and is updated each time the assessment is run. The report file is then deleted or made inaccessible at a predetermined time after initiation of the initial security inquiry.

Figure 4:
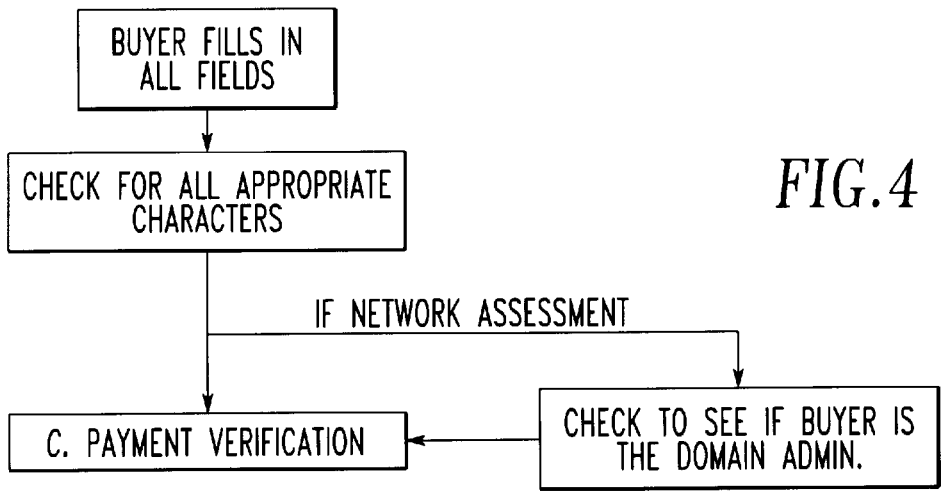
FIG. 4 is a flow chart showing steps of verifying the user's authorization.
Figure 5:
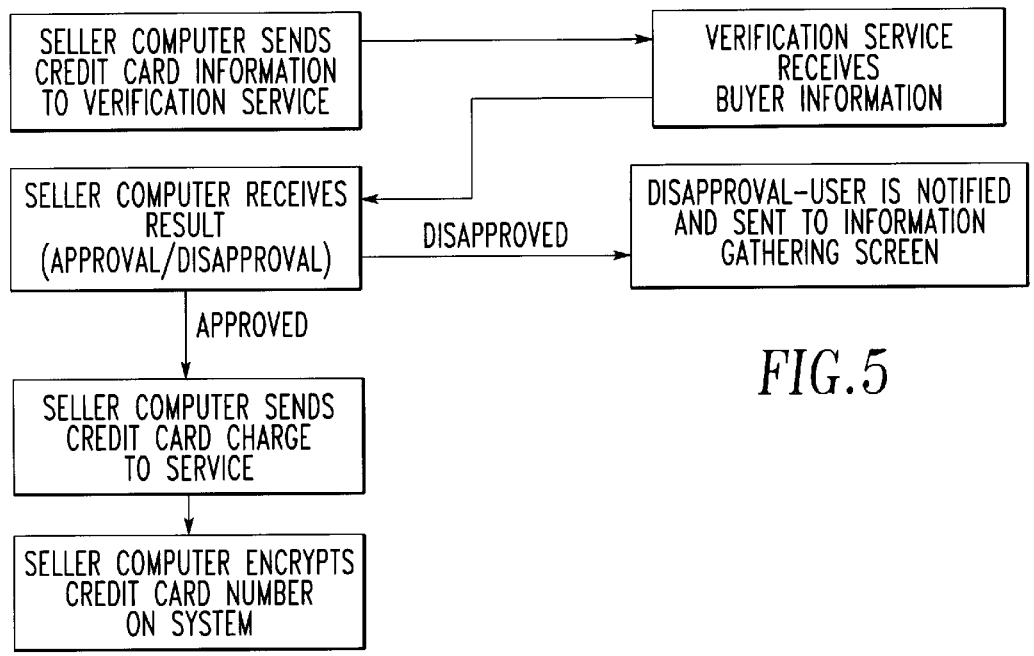
FIG. 5 illustrates payment verification steps.

FIG. 4 illustrates the steps of information gathering, with reference to obtaining payment information from the user and also for ensuring the user's authorization to assess the security of the target host(s). The information from the user is input using a hypertext form in a conventional manner to enter name, address and account information. For reporting the file name to be used to store the assessment results, an email address is required. In the event that the user is assessing the security of an entire network, the appropriate Internet database (including international databases) can be accessed by server 26 to determine whether the user is the named administrator of the target network. An appropriate error message can be sent declining to accept the transaction if incomplete or unverified data is received as to authorization or payment, or if the requester is not found to be the system administrator in the case of a network scan. FIG. 5 similarly illustrates authorization in connection with payment verification, also through a third party credit card service 28.

Figure 6:
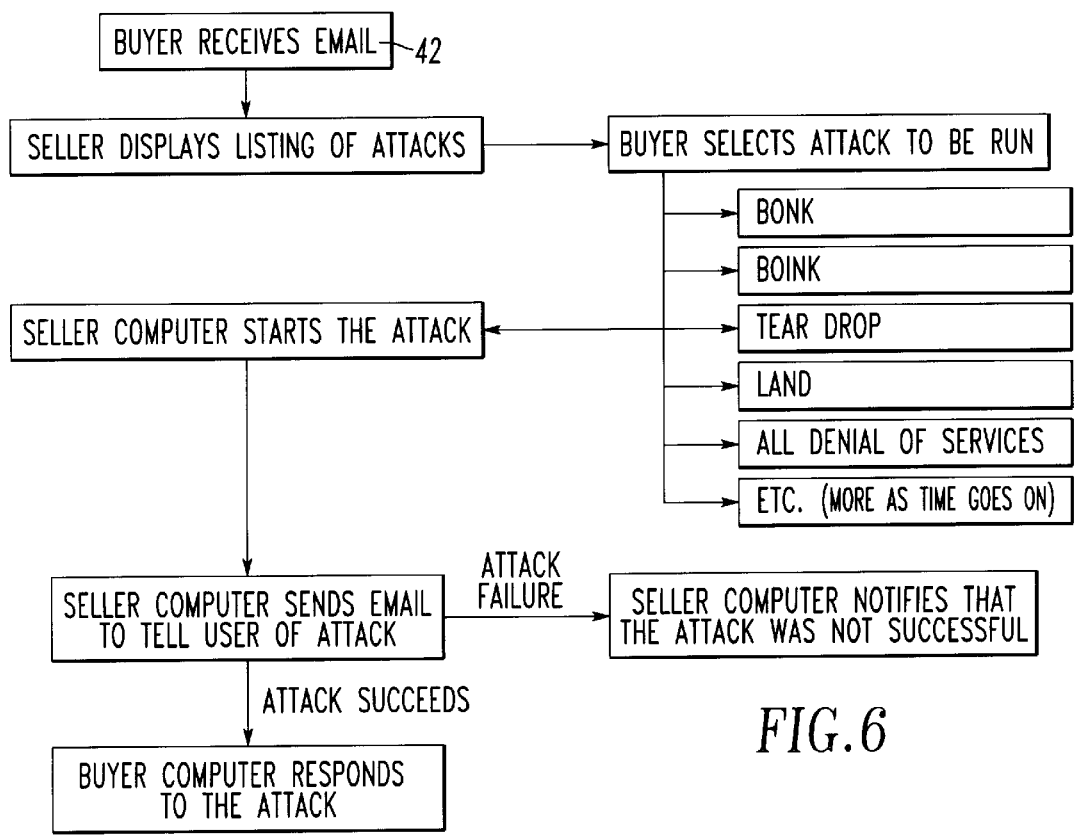
FIG. 6 shows the selection of denial of service attacks.

The user can select a denial of service assessment, shown in FIG. 6, wherein TCP/IP communications are accomplished to inquire with the TCP ports of the target host. This can be done through at least one network firewall; however, the firewall may block certain communications and thereby conceal services that are available internally on the user's LAN or WAN. After proceeding through the authorization and payment procedures, the user receives an email containing a URL link to a page. By loading the hypertext page to which the email is linked, the user is offered a list of attacks to select. In the example shown, the Bonk, Boink, Tear Drop and Land attacks are mentioned. However, new attacks are conceived from time to time, and additional attacks can be added to the list offered by server 26 as they are discovered.

If an attack is successful, target host 22 may lock up, slow down, etc. If a reboot is needed at the target host, the server attempts to notify the client, via e-mail, which attack they are vulnerable to. The user then can reinitiate the scan after they have fixed the vulnerability. In any event, the report file is developed at server 26. After a vulnerability test, the results are loaded into hypertext report file 48. The test can be run any number of times, preferably to assess the situation after attempting to fix vulnerabilities mentioned in an earlier report.

Figure 7:
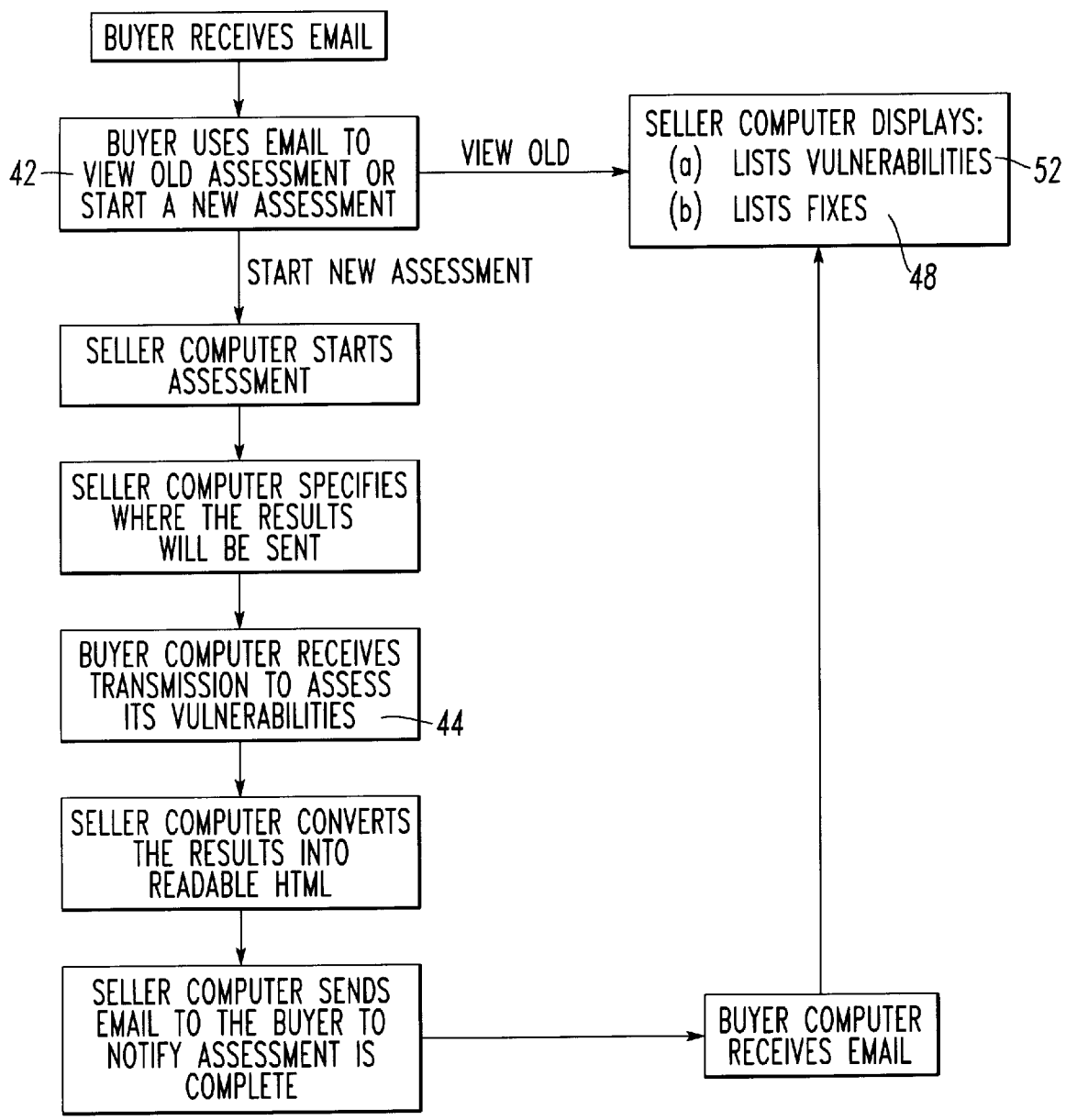
FIG. 7 shows security assessment steps for a single host.

FIG. 7 illustrates communication steps in connection with a single machine assessment. After authorization, a randomized long file name is generated for hypertext report file 48. The test is run and reported in html form in a file on server 26 named by that URL. The server or seller 26 notifies the user that the assessment is complete by sending an email having a URL link to the report file page 48. The user can view vulnerabilities found and by URL links in the report file proceed to view suggested fixes and other information.

Figure 8:
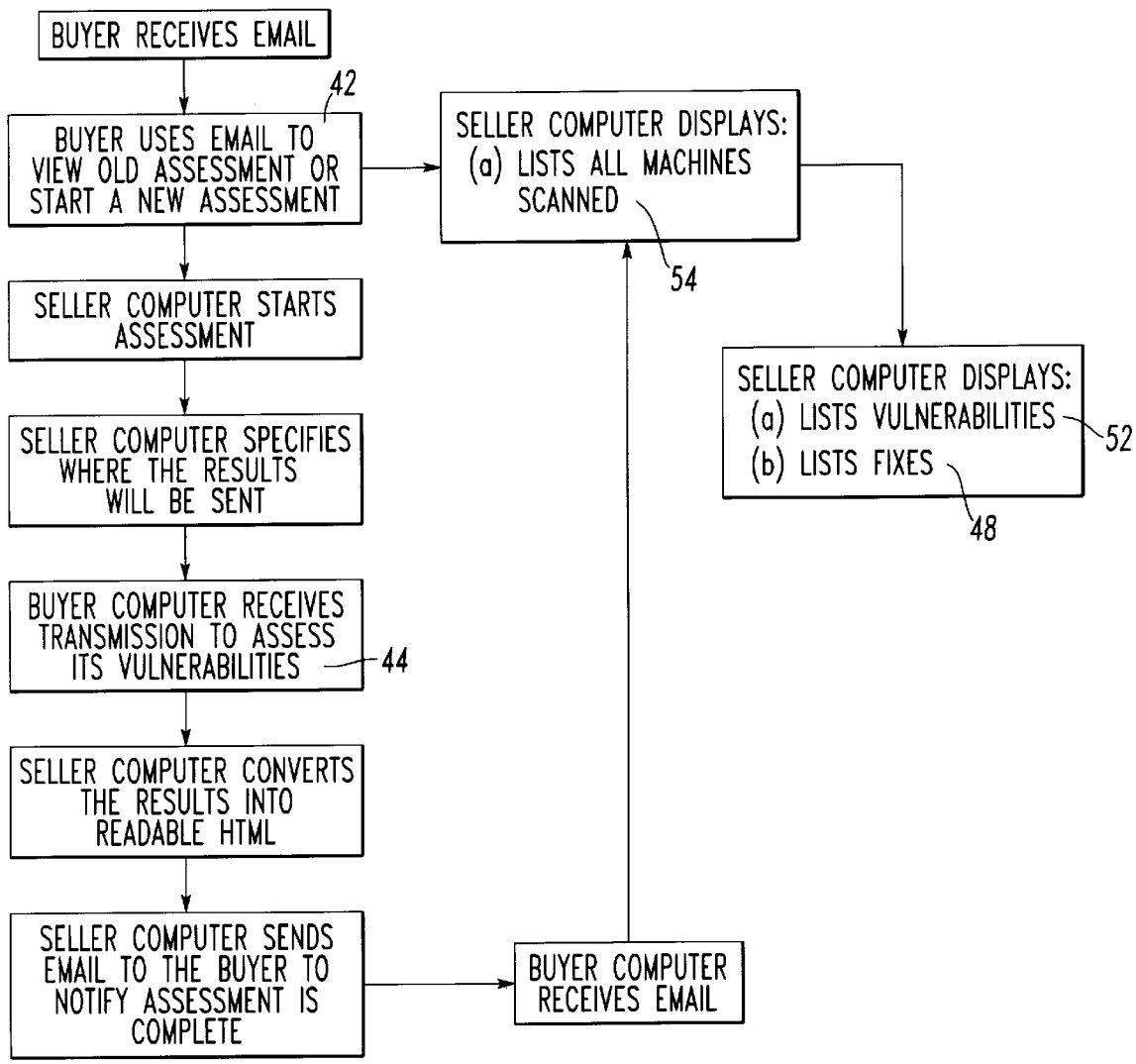
FIG. 8 shows assessment of a full network.

The procedure for a full network scan as shown in FIG. 8 is similar except that the seller report also includes a page 54 that lists the machines scanned, each being hyperlinked to the respective machine's individual report. As above, each individual machine's report file contains links to information files containing explanations of the vulnerabilities such as their implications in the event of an attack, and information on how to fix them.

For scanning all the machines on a network, the identification of the target host can be limited to an upper level domain TCP/IP address. In authorizing the user as a network administrator, the TCP/IP address of the network is determined. The TCP/IP address of the target computer (stored in the format nnn.nnn.nnn.nnn) can simply be truncated (nnn.nnn.nnn. - - - ) to obtain the upper level, and the TCP ports of all the lower addresses are then scanned in turn (nnn.nnn.nnn.000 to nnn.nnn.nnn.255). Prior to scanning, however, each host is pre-qualified by ensuring that the subject host has a valid hostname (i.e., using Internet lookup via domain name servers).

In addition to scanning for the presence of services on the target host and for the vulnerability of target host TCP ports to denial of service attacks, the availability of target host files to remote viewing can be checked. The system can check for predetermined versions of operating software and identify vulnerable versions known to be susceptible to particular attacks. Shell access availability to an arbitrary host can be tested, and target host access control settings can be examined.

FIGS. 9 through 19 are examples of printouts obtained according to the invention as described. FIG. 9 is a first email after a user is authorized and/or has arranged for payment. This email contains the URL link to a copy of the single machine assessment page, and is uniquely named with a randomized long numeric file name generated by server 26 for user 22. The second email, shown in FIG. 10, is sent after the assessment and has a URL pointing to the hypertext report file 48 that server 26 generates, including a list of vulnerabilities linking to information sites on the server or elsewhere on the network. The first email is sent after the user has selected an assessment using the starting page (FIG. 11); advanced by hyperlinks through an explanation of the assessment (FIG. 12); and, filled in the form information for stating identity, email address and payment details (FIG. 13). Provided complete information is obtained and the payment is authorized, and in the case of a full network scan also verified by directory information, the "thank you" page (FIG. 14) reports back to the user and states how long the web pages will remain accessible.

The user can choose to display the results of a previous scan or run a new scan by clicking the appropriate links on a further page (FIG. 15), whereupon the scan commences and the user is reminded that the report can be accessed at a URL address to be obtained by checking their email (FIG. 16). The scan takes several minutes for a single machine scan, during which time communications are undertaken between the server and the target host. When communicating through a firewall the time is increased somewhat because the server must time out or retry one or more times when an inquiry goes unanswered.

Figure 17:
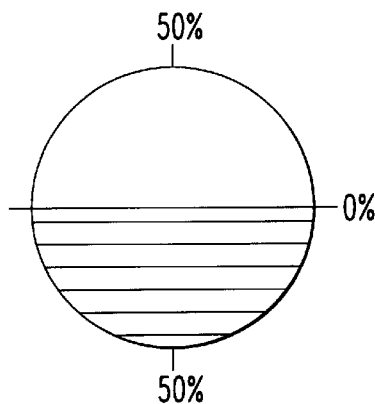
FIG. 17 is a page unique to the user transaction, including reported security vulnerabilities in the form of hypertext links.

FIG. 17 is an example report page. The overall state of the target host (in this case glahepc.ard.com) was found to have two vulnerabilities, namely no X server access control and potentially insecure NetBIOS. The vulnerabilities are listed in the page and provide hypertext links to reports (FIGS. 18A–18B and 19) that summarize the problem and how it can be fixed. The page in FIG. 19 also has links to third party sources of information to which the user is referred. After attempting a fix, the user returns to the security assessment screens to run the assessment again using the same file names for the selection and report pages.

In the foregoing embodiment, the security assessment service is maintained as a service on server 26 rather than being distributed as a software program. Thus it is readily possible to revise and update the security assessments available as vulnerabilities are discovered. Security assessments according to the invention are widely available for users to assess their own security or the security of hosts that they administer, while making it very difficult for an unscrupulous person to obtain a security report run on another party's host.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method for assessing security vulnerabilities of at least one target host coupled to a network, comprising the steps of:
   establishing a network connection between an arbitrary host coupled to the network and a server, and accepting data input from the arbitrary host to the server, the data identifying the arbitrary host and identifying the target host;
   determining a network address of the arbitrary host and consulting a certification file for confirming that the arbitrary host is authorized to assess the security vulnerabilities of the target host;
   establishing a uniquely named file, accessible to the arbitrary host;
   conducting at least one vulnerability test by communicating with the target host, and loading a result of the vulnerability test into the uniquely named file;
   transmitting an identification of the uniquely named file to the network address of the arbitrary host; and,
   downloading the uniquely named file to the arbitrary host, whereby the security vulnerabilities of the target host can be assessed.

2. The method for assessing security vulnerabilities of claim 1, wherein the network is coupled to one of an internet and an intranet, and said accepting, consulting, conducting, transmitting and downloading steps are accomplished by TCP/IP communications over the network.

3. The method for assessing security vulnerabilities of claim 2, wherein said confirming that the arbitrary host is authorized comprises accepting payment information from the user and exchanging data with a third party for accepting payment in connection with a transaction for security assessment services.

4. The method for assessing security vulnerabilities of claim 2, wherein said TCP/IP communications are accomplished through at least one network firewall.

5. The method for assessing security vulnerabilities of claim 2, wherein the data input from the arbitrary host to the server is accepted using a hypertext form page, and the uniquely named file accessible to the arbitrary host comprises a hypertext report page having links to files containing hypertext explanations of the vulnerabilities.

6. The method for assessing security vulnerabilities of claim 2, wherein said identifying of the target host comprises specifying an upper level domain TCP/IP address and wherein said vulnerability test is conducted on all hosts found at lower levels of said upper level domain.

7. The method for assessing security vulnerabilities of claim 6, wherein said step of confirming that the arbitrary host is authorized comprising communicating with a database containing identifications of systems operators associated with the upper level domain and comparing a username associated with the arbitrary host to an identification of a systems operator of the target host.

8. The method for assessing security vulnerabilities of claim 2, wherein the report file contains links to information files containing explanations of the vulnerabilities, and further comprising selectively transferring the user to said information files.

9. The method for assessing security vulnerabilities of claim 2, wherein said identification of the target host contains an upper level domain TCP/IP address and further comprising conducting a vulnerability test on all hosts found at lower levels of said upper level domain.

10. The method for assessing security vulnerabilities of claim 9, wherein said step of confirming that the arbitrary host is authorized comprising communicating with a database containing identifications of systems operators associated with the upper level domain and comparing a username associated with the arbitrary host to an identification of a systems operator of the target host.

11. The method for assessing security vulnerabilities of claim 1, further comprising conducting said at least one vulnerability test and loading a subsequent result of the vulnerability test into the uniquely named file at least one further time when an inquiry is made by said arbitrary user with respect to the target host, whereby fixes of the security vulnerabilities can be assessed.

12. The method for assessing security vulnerabilities of claim 11, further comprising recording a time of an initial step of said conducting the at least one vulnerability test, and discontinuing access to the uniquely named file at a predetermined time after an initial security inquiry.

13. The method for assessing security vulnerabilities of claim 1, wherein the vulnerability test comprises testing for at least one of
   presence of services on the target host;
   vulnerability of target host TCP ports to denial of service attack;
   accessibility of target host files to the arbitrary host for one of viewing and export;
   presence of predetermined versions of operating software;
   shell access availability to the arbitrary host; and,
   target host access control settings.

14. A method for assessing security vulnerabilities of at least one target host coupled to the internet while guarding security of a security inquiry, comprising the steps of:
   providing a server on the internet with an internet-accessible hypertext forms page by which a user at an arbitrary host on the internet can input to the server a username and domain name identifying the user and the arbitrary host, and an identification of the target host, and accepting said username, domain name and identification from the user;
   determining a network address of the arbitrary host and consulting a certification file for at least one of determining a network address of a mailserver of the user and confirming that the user at the arbitrary host is authorized to assess the security vulnerabilities of the target host, and authorizing the security inquiry;

establishing a facts file on the server associated with the security inquiry;

determining services available at the target host by communicating over at least a subset of TCP/IP ports of the target host, and building a table of said services including responses of the TCP/IP ports of the target host;

operating a security algorithm to compare the responses to stored data for identifying likely security vulnerabilities as a function of the responses;

establishing a hypertext report file accessible to the arbitrary host and inserting report information identifying said likely security vulnerabilities, the report file having a URL unique to the security inquiry, user and arbitrary host, the report file being deleted at a predetermined time after initiation of the security inquiry; and, reporting the URL to the user.

15. The method for assessing security vulnerabilities of claim 14, further comprising accepting payment information from the user and exchanging data with a third party for accepting payment in connection with a transaction for security assessment services.

16. The method for assessing security vulnerabilities of claim 15, wherein said TCP/IP communications are accomplished through at least one network firewall.

17. The method for assessing security vulnerabilities of claim 14, further comprising conducting said at least one vulnerability test and loading a subsequent result of the vulnerability test into the hypertext report file at least one further time when an inquiry is made by said user with respect to the target host, whereby fixes of the security vulnerabilities can be assessed.

18. The method for assessing security vulnerabilities of claim 14, further comprising recording a time of an initial step of establishing said facts file, and discontinuing access to the hypertext report file at a predetermined time after an initial security inquiry by the user.

19. The method for assessing security vulnerabilities of claim 14, wherein the vulnerability test comprises testing for at least one of presence of services on the target host;

vulnerability of target host TCP ports to denial of service attack;

accessibility of target host files to the arbitrary host for one of viewing and export;

presence of predetermined versions of operating software;

shell access availability to the arbitrary host; and, target host access control settings.

\* \* \* \* \*

UNITED STATES PATENT AND TRADEMARK OFFICE
CERTIFICATE OF CORRECTION

PATENT NO. : 6,185,689 B1  Page 1 of 1
DATED : February 6, 2001
INVENTOR(S) : Robert E. Todd, Sr. et al.

It is certified that error appears in the above-identified patent and that said Letters Patent is hereby corrected as shown below:

<u>Title page</u>,
OTHER PUBLICATIONS, 2nd reference, "Analysing" should read
-- Analyzing --.

<u>Column 5</u>,
Line 47, "FIGS. 12A-12C" should read -- FIG. 12 --.

Signed and Sealed this

First Day of January, 2002

Attest:

JAMES E. ROGAN
*Attesting Officer*  *Director of the United States Patent and Trademark Office*